US012435540B2

(12) United States Patent
Graham et al.

(10) Patent No.: US 12,435,540 B2
(45) Date of Patent: Oct. 7, 2025

(54) EXIT DEVICE WITH SELF-ADJUSTING COUPLING MECHANISM

(71) Applicant: Schlage Lock Company LLC, Carmel, IN (US)

(72) Inventors: Matthew S. Graham, Noblesville, IN (US); Gregory Musselman, Indianapolis, IN (US); Justin Wenger, Carmel, IN (US)

(73) Assignee: Schlage Lock Company LLC, Carmel, IN (US)

( * ) Notice: Subject to any disclaimer, the term of this patent is extended or adjusted under 35 U.S.C. 154(b) by 657 days.

(21) Appl. No.: 16/171,539

(22) Filed: Oct. 26, 2018

(65) Prior Publication Data

US 2019/0128018 A1 May 2, 2019

Related U.S. Application Data

(60) Provisional application No. 62/577,697, filed on Oct. 26, 2017.

(51) Int. Cl.
*E05B 9/08* (2006.01)
*E05B 53/00* (2006.01)
(Continued)

(52) U.S. Cl.
CPC .............. *E05B 9/08* (2013.01); *E05B 53/003* (2013.01); *E05B 63/0056* (2013.01);
(Continued)

(58) Field of Classification Search
CPC ...... E05B 9/08; E05B 53/003; E05B 63/0056; E05B 65/1006; E05B 65/1053;
(Continued)

(56) References Cited

U.S. PATENT DOCUMENTS 1,815,584 A * 7/1931 Prinzler .............. E05B 65/1066
70/210
3,811,717 A * 5/1974 Floyd .................... E05B 65/104
292/153
(Continued)

FOREIGN PATENT DOCUMENTS

FR 2861789 A1 * 5/2005 ............... E05B 3/04

OTHER PUBLICATIONS

Von Duprin—Installation Instructions—98/9949 and CS 98/9949 (2014) © Allegion 2014 Printed in U.S.A. 23970734 Rev. 03/14-g (Year: 2014).*

(Continued)

*Primary Examiner* — Kristina R Fulton
*Assistant Examiner* — Noah Horowitz
(74) *Attorney, Agent, or Firm* — Taft Stettinius & Hollister LLP

(57) ABSTRACT

An exemplary exit device includes a remote latch mechanism and a transmission assembly operably coupled with the remote latch mechanism. The exit device further includes a pushbar assembly including a drive assembly and a latch control assembly operably coupled with the drive assembly such that the drive assembly is operable to actuate the latch control assembly. A self-adjusting coupling assembly operably connects the transmission assembly with the latch control assembly. The self-adjusting coupling assembly includes a lift finger movably mounted to a movable component of the latch control assembly, and a spring urging the lift finger into contact with a transmission of the transmission assembly. A first fastener selectively secures the first lift finger to the first movable component.

26 Claims, 13 Drawing Sheets

(51) Int. Cl.
*E05B 63/00* (2006.01)
*E05B 65/10* (2006.01)

(52) U.S. Cl.
CPC ...... *E05B 65/1006* (2013.01); *E05B 65/1053* (2013.01); *E05B 65/1093* (2013.01)

(58) Field of Classification Search
CPC .... E05B 65/1093; E05B 63/06; E05B 53/005; E05B 65/10; E05B 65/1046; E05B 17/06; E05C 9/002; E05C 9/006; E05C 9/04; E05C 9/042; E05C 9/043; E05C 9/048; E05C 9/14; E05C 9/16; E05C 9/20; Y10T 292/0908; Y10T 292/0909; Y10T 292/091; Y10T 292/0855; Y10T 70/5159; Y10S 292/21; Y10S 292/60; Y10S 292/65; Y10S 292/53; Y10S 292/54; Y10S 292/55; Y10S 292/64
See application file for complete search history.

(56) References Cited

U.S. PATENT DOCUMENTS 4,601,499 A * 7/1986 Kim .......................... E05C 9/20 292/DIG. 60
4,741,563 A * 5/1988 Cohrs ................. E05B 65/1046 292/168
5,169,185 A * 12/1992 Slaybaugh .......... E05B 65/1053 292/21
5,520,427 A * 5/1996 Mader ....................... E05C 9/04 70/222
6,120,071 A 9/2000 Picard et al.
6,174,004 B1 1/2001 Picard et al.
6,205,825 B1 3/2001 Haeck et al.
6,769,723 B2 8/2004 Cohrs, Jr. et al.
6,820,905 B1 * 11/2004 Haeck ................. E05B 65/1013 292/223
6,945,571 B2 * 9/2005 Lin ..................... E05B 65/1053 292/DIG. 55
7,118,141 B2 10/2006 Cohrs, Jr. et al.
7,641,244 B2 * 1/2010 Lin ....................... E05B 65/106 292/92
7,748,757 B2 * 7/2010 Shen ................... E05B 65/1006 70/92
7,887,107 B2 * 2/2011 Shen ................... E05B 65/1006 292/93
8,146,961 B2 * 4/2012 Schacht .............. E05B 65/1053 292/DIG. 65
8,424,928 B2 * 4/2013 Lin ......................... E05B 53/00 70/92
8,702,132 B2 * 4/2014 Tien .................... E05B 65/1013 292/93
9,140,032 B2 * 9/2015 Lin ..................... E05B 17/0066
9,151,093 B2 * 10/2015 Lin ......................... E05C 7/045
9,580,944 B2 * 2/2017 Arlinghaus ......... E05B 65/1046
2009/0139283 A1 * 6/2009 Peng .................. E05B 65/1013 70/92
2010/0045053 A1 2/2010 Dye et al.
2013/0093195 A1 * 4/2013 Tien ...................... E05B 65/104 292/93
2013/0154283 A1 * 6/2013 Arlinghaus ........... E05B 47/023 292/214
2014/0109479 A1 4/2014 Morstatt et al.
2014/0132009 A1 * 5/2014 Chiang ................... E05C 3/124 292/164
2019/0178006 A1 * 6/2019 Capozziello ............ E05B 63/06
2019/0316383 A1 * 10/2019 Kondi ................... E05B 63/185
2019/0352937 A1 * 11/2019 Mckibben ........... E05B 65/1093

OTHER PUBLICATIONS

Von Duprin—Installation Instructions—98/9949 and CS98/9949 (2014) © Allegion 2014 Printed in U.S.A. , 23970734 Rev. 03/14-g (Year: 2014).*
Von Duprin—Installation Instructions—98/9949 and CS98/9949 @ Allegion 2014 Printed in U.S.A., 23970734 Rev. 03/14-g (Year: 2014).*
Von Duprin 98_9949 Installation Instructions-Sold Prior to Aug. 10, 2016 (23970734) @ Allegion 2015 Printed in U.S.A. 23970734 Rev. 10/15-h (Year: 2015).*
Von Duprin 98/9947 & 98/9949 Series Exit Devices Service Manual; Rev. 11/14; 26 pages; Copyright 2014 Allegion.
Von Duprin 98/9949 & CS 98/9949 Installation Instructions; Rev. 7/16; 16 pages; Copyright Allegion 2016.
ALLEGION; Von Duprin 98/9947 & 98/9949 Series Exit Devices Service Manual; 26 pages; Copyright 2014 Allegion.
Canadian Office Action; Canadian Intellectual Property Office; Canadian Patent Application No. 3,022,369; dated Sep. 17, 2019; 4 pages.

* cited by examiner

EXIT DEVICE WITH SELF-ADJUSTING COUPLING MECHANISM

CROSS-REFERENCE TO RELATED APPLICATIONS

This application claims the benefit of U.S. Provisional Patent Application No. 62/577,697, filed on Oct. 26, 2017, the contents of which are incorporated by reference in their entirety.

TECHNICAL FIELD

The present disclosure generally relates to exit devices, and more particularly but not exclusively relates to systems and methods for adjusting exit devices including one or more remote latching mechanisms.

BACKGROUND

Exit devices are commonly installed to doors to provide for rapid egress, and typically include one or more latching mechanisms operable to engage a door frame to retain the door in a closed position, and a pushbar assembly operable to retract the latching mechanisms to permit opening of the door. Certain exit devices include a remote latching assembly in which one or more of the latching mechanisms is positioned remotely from the pushbar assembly, for example at the top and/or bottom of the door. The remote latching assembly typically includes a transmission assembly that is operatively connected to the remote latching mechanism(s) via one or more vertical connectors, such as rods and/or cables. The transmission assembly is also operatively connected with the pushbar assembly such that actuation of the pushbar assembly causes a corresponding actuation of the one or more remote latching mechanisms. Such exit devices are commonly referred to as "vertical" exit devices due to the vertical offset of the remote latching mechanism(s) from the drive assembly.

The installation process for vertical exit devices typically involves adjusting the operative connection between the pushbar assembly and the remote latching mechanisms, for example by adjusting the effective length of the connectors. The adjustment procedures may involve coarse adjustments and/or fine adjustments of the operative connection. For certain exit devices, the coarse adjustment is typically performed prior to attaching the connector to the remote latch and/or the drive assembly. Such coarse adjustment may, for example, include cutting a rod or cable to a suggested length, or wrapping a portion of a cable about a spool. In certain exit devices, the fine adjustment is typically performed with the connector attached to the remote latch mechanism and the transmission assembly. Such fine adjustment may, for example, involve the use of threaded connections by which the effective length can be adjusted.

These adjustment procedures are often necessitated by factors beyond the control of the device manufacturer, such as variations in one or more of the door preparation, the dimensions of the door, and the installation of the pushbar assembly. For many vertical exit devices, the adjustment procedure has a significant effect on the functioning of the exit device. Improper adjustment may lead to undesirable outcomes. For example, the pushbar assembly may be prevented from fully retracting the remote latching mechanisms. This may lead to dragging of the bottom bolt along the floor and/or a failure-to-egress failure condition in which the remote latch remains engaged with the door frame and prevents opening of the door. As another example, the remote latch mechanism may be unable to move to its fully extended position. This may lead to a failure-to-secure condition, in which the remote latch is prevented from engaging the door frame in the manner required to latch the door in the closed position.

In light of the foregoing, it should be evident that for many vertical exit devices, proper performance of the adjustment procedure can be critical to the reliable functioning of the exit device. For many existing vertical exit devices, the adjustment procedure often requires the installer to make decisions based upon their experience, and can be time-consuming and complicated. These factors can lead to frustration for the installer, and may result in incorrect adjustment that leads to issues such as bottom bolt dragging, failure to secure, and/or failure to egress. For these reasons among others, there remains a need for further improvements in this technological field.

SUMMARY

Figure 1:
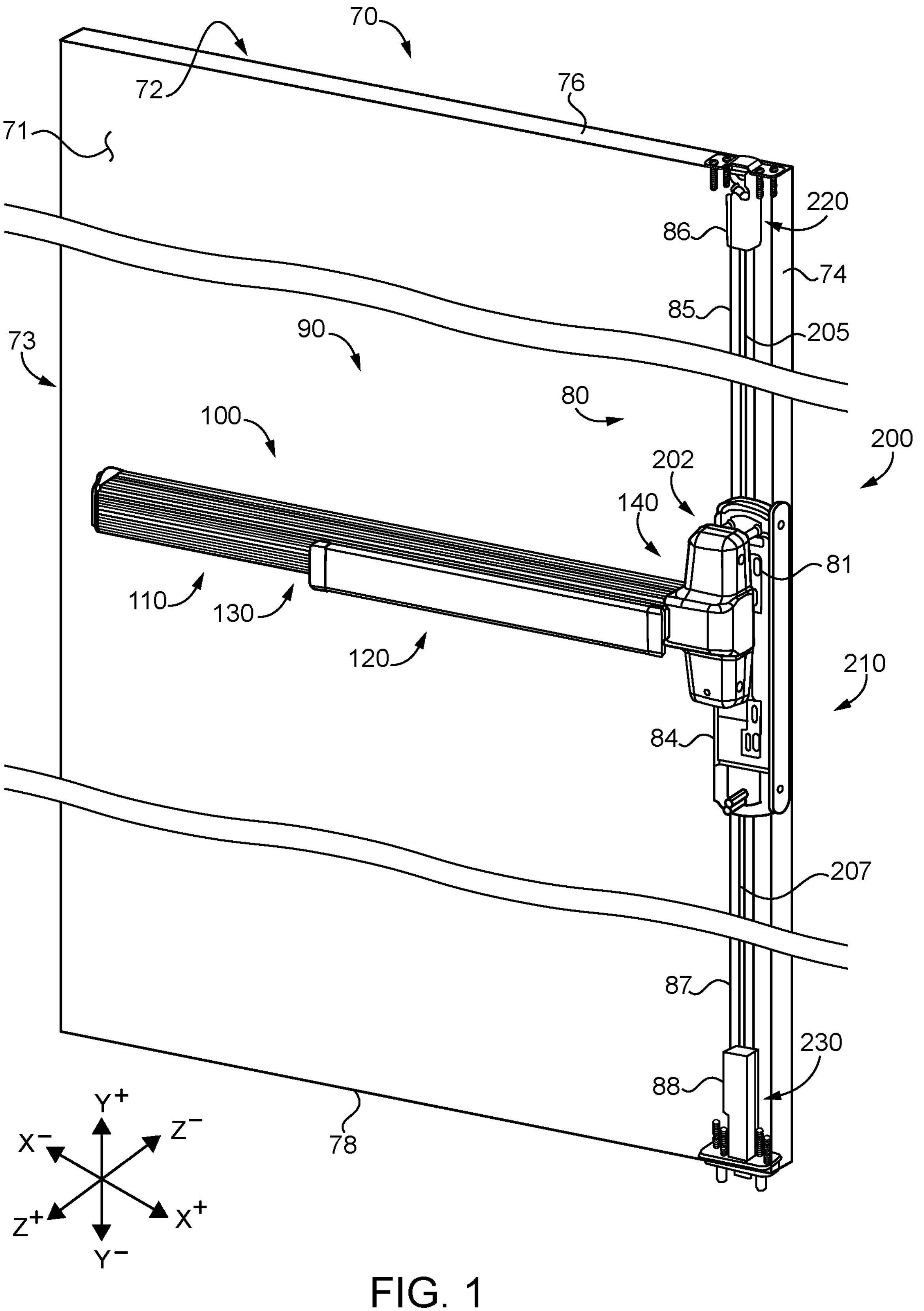
FIG. 1 illustrates a door having installed thereon an exit device according to certain embodiments, which includes a pushbar assembly, a remote latching assembly, and a self-adjusting coupling assembly according to certain embodiments.

An exemplary exit device includes a remote latch mechanism and a transmission assembly operably coupled with the remote latch mechanism. The exit device further includes a pushbar assembly including a drive assembly and a latch control assembly operably coupled with the drive assembly such that the drive assembly is operable to actuate the latch control assembly. A self-adjusting coupling assembly operably connects the transmission assembly with the latch control assembly. The self-adjusting coupling assembly includes a lift finger movably mounted to a movable component of the latch control assembly, and a spring urging the lift finger into contact with a transmission of the transmission assembly. A first fastener selectively secures the first lift finger to the first movable component. Further embodiments, forms, features, and aspects of the present application shall become apparent from the description and figures provided herewith.

DETAILED DESCRIPTION OF ILLUSTRATIVE EMBODIMENTS

Although the concepts of the present disclosure are susceptible to various modifications and alternative forms, specific embodiments have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. It should further be appreciated that although reference to a "preferred" component or feature may indicate the desirability of a particular component or feature with respect to an embodiment, the disclosure is not so limiting with respect to other embodiments, which may omit such a component or feature. Further, when a particular feature, structure, or characteristic is described in connection with an embodiment, it is submitted that it is within the knowledge of one skilled in the art to implement such feature, structure, or characteristic in connection with other embodiments whether or not explicitly described.

Additionally, it should be appreciated that items included in a list in the form of "at least one of A, B, and C" can mean (A); (B); (C); (A and B); (B and C); (A and C); or (A, B, and C). Similarly, items listed in the form of "at least one of A, B, or C" can mean (A); (B); (C); (A and B); (B and C); (A and C); or (A, B, and C). Further, with respect to the claims, the use of words and phrases such as "a," "an," "at least one," and/or "at least one portion" should not be interpreted so as to be limiting to only one such element unless specifically stated to the contrary, and the use of phrases such as "at least a portion" and/or "a portion" should be interpreted as encompassing both embodiments including only a portion of such element and embodiments including the entirety of such element unless specifically stated to the contrary.

In the drawings appended hereto, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures unless indicated to the contrary. Additionally, the inclusion of a structural or method feature in a particular figure is not meant to imply that such feature is required in all embodiments and, in some embodiments, may not be included or may be combined with other features.

As used herein, the terms "longitudinal," "lateral," and "transverse" are used to denote motion or spacing along three mutually perpendicular axes, wherein each axis defines two opposite directions. In the coordinate system illustrated in FIG. 1, the X-axis defines first and second longitudinal directions, the Y-axis defines first and second lateral directions, and the Z-axis defines first and second transverse directions. Additionally, the descriptions that follow may refer to the directions defined by the axes with specific reference to the orientations illustrated in the Figures. More specifically, the longitudinal (X) directions may be referred to as "proximal" ($X^+$) and "distal" ($X^-$), the lateral (Y) directions may be referred to as "upward" ($Y^+$) and "downward" ($Y^-$), and the transverse (Z) directions may be referred to as "forward" ($Z^+$) and "rearward" ($Z^-$). These terms are used for ease and convenience of description, and are without regard to the orientation of the system with respect to the environment. For example, descriptions that reference a longitudinal direction may be equally applicable to a vertical direction, a horizontal direction, or an off-axis orientation with respect to the environment.

Furthermore, motion or spacing along a direction defined by one of the axes need not preclude motion or spacing along a direction defined by another of the axes. For example, elements which are described as being "laterally offset" from one another may also be offset in the longitudinal and/or transverse directions, or may be aligned in the longitudinal and/or transverse directions. The terms are therefore not to be construed as limiting the scope of the subject matter described herein.

Figure 7:
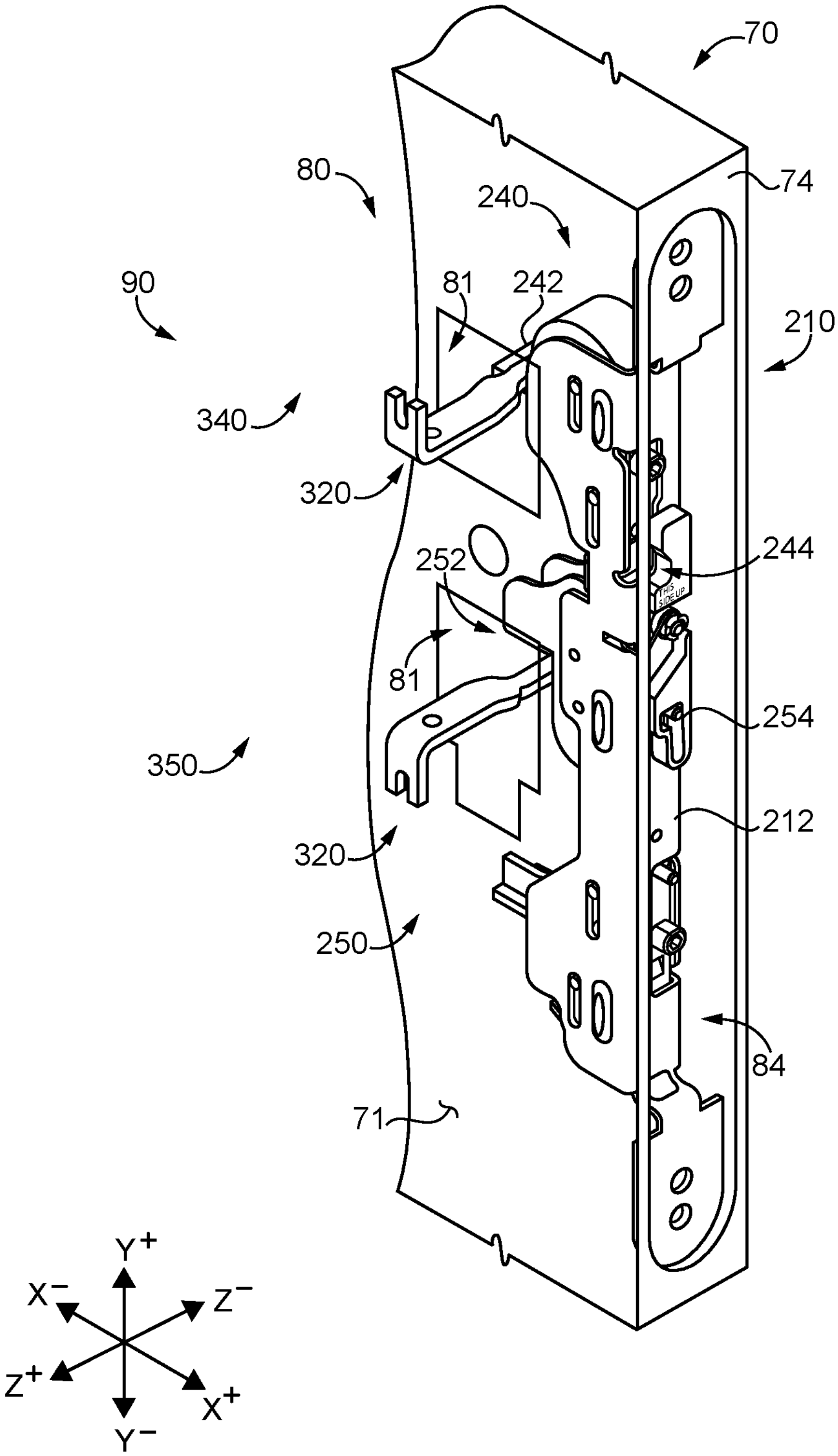
FIG. 7 is a perspective illustration of a portion of the door and selected components of the exit device illustrated in FIG. 1.

With reference to FIG. 1, illustrated therein is a door 70 having an exit device 90 mounted thereto. The door 70 has an interior side surface 71, an exterior side surface 72 opposite the interior side surface 71, a hinge edge 73, a free edge 74 opposite the hinge edge 73, a top edge 76, and a bottom edge 78 opposite the top edge 76. The door 70 also has a door preparation 80 including a set of openings or cavities that facilitate the mounting of the exit device assembly 90. In the illustrated form, the door preparation 80 includes a center cavity 84 extending distally from the free edge 74, an upper cavity 86 extending downward from the top edge 76, and a lower cavity 88 extending upward from the bottom edge 78. An upper channel 85 extends between the center cavity 84 and the upper cavity 86, and a lower channel 87 extends between the center cavity 84 and the lower cavity 88. As illustrated in FIG. 7, the door preparation 80 also includes a pair of openings 81 that are formed in the interior side surface 71, and which are connected to the center cavity 84.

Figure 2:
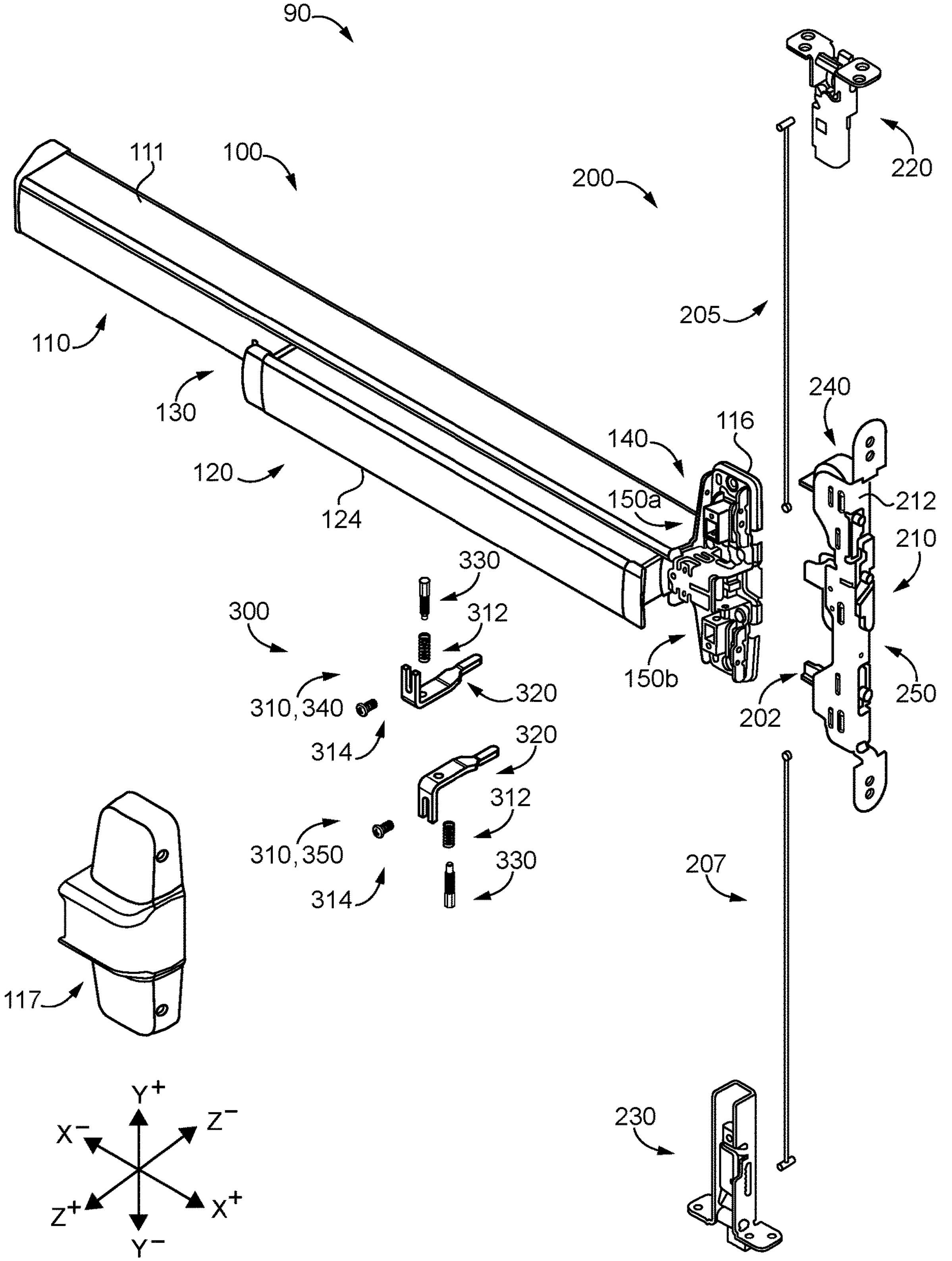
FIG. 2 is a partially-exploded assembly view of the exit device illustrated in FIG. 1.

With additional reference to FIG. 2, the exit device 90 generally includes a pushbar assembly 100, a remote latching assembly 200, and a self-adjusting coupling assembly 300 according to certain embodiments. The pushbar assembly 100 generally includes a mounting assembly 110 configured for mounting to the door 70, and a drive assembly 120 mounted to the mounting assembly 110 for movement between an actuated state and a deactuated state. The pushbar assembly 100 further includes a dogging mechanism 130 operable to selectively retain the drive assembly 120 in the actuated state, and a latch control assembly 140 operably connected with the drive assembly 120. As described herein, the drive assembly 120 is biased toward the deactuated state, and is operable to be driven to the actuated state when manually actuated by a user. The latch control assembly 140 also has an actuated state and a deactuated state, and is configured to move from its deactuated state to its actuated state in response to actuation of the drive assembly 120.

The remote latching assembly 200 generally includes a transmission assembly 210 mounted in the center cavity 84, a first or upper latch mechanism 220 mounted in the upper cavity 86, and a second or lower latch mechanism 230 mounted in the lower cavity 88. A faceplate 204 is mounted to the free edge 74 of the door 70 and retains the transmission assembly 210 in the center cavity 84. The transmission assembly 210 includes a first or upper transmission 240 and a second or lower transmission 250, and is operably connected with the upper latch mechanism 220 and the lower latch mechanism 230. More specifically, the upper transmission 240 is connected to the upper latch mechanism 220 via a first or upper link member or connector 205 that extends through the upper channel 85, and the lower transmission 250 is operably connected with the lower latch mechanism 230 via a second or lower link member or connector 207 that extends through the lower channel 87.

The self-adjusting coupling assembly 300 includes at least one self-adjusting coupling mechanism 310, each of which generally includes a biasing member in the form of a spring 312, a lift finger 320 engaged with the spring 312, a mounting post 330 to which the lift finger 320 is slidably mounted, and a releasable fastener in the form of a screw 314 for securing the lift finger 320 to the latch control assembly 140. In the illustrated embodiment, the coupling assembly 300 includes a first or upper coupling mechanism 340 and a second or lower coupling mechanism 350, each of which is provided in the form of the self-adjusting coupling mechanism 310. As described herein, the coupling assembly 300 operably connects the pushbar assembly 100 with the transmission assembly 210 such that the pushbar assembly 100 is operable to actuate the remote latching assembly 200. More specifically, the latch control assembly 140 is operably connected with the upper transmission 240 via the upper coupling mechanism 340, and is operably connected with the lower transmission 250 via the lower coupling mechanism 350.

Figure 3:
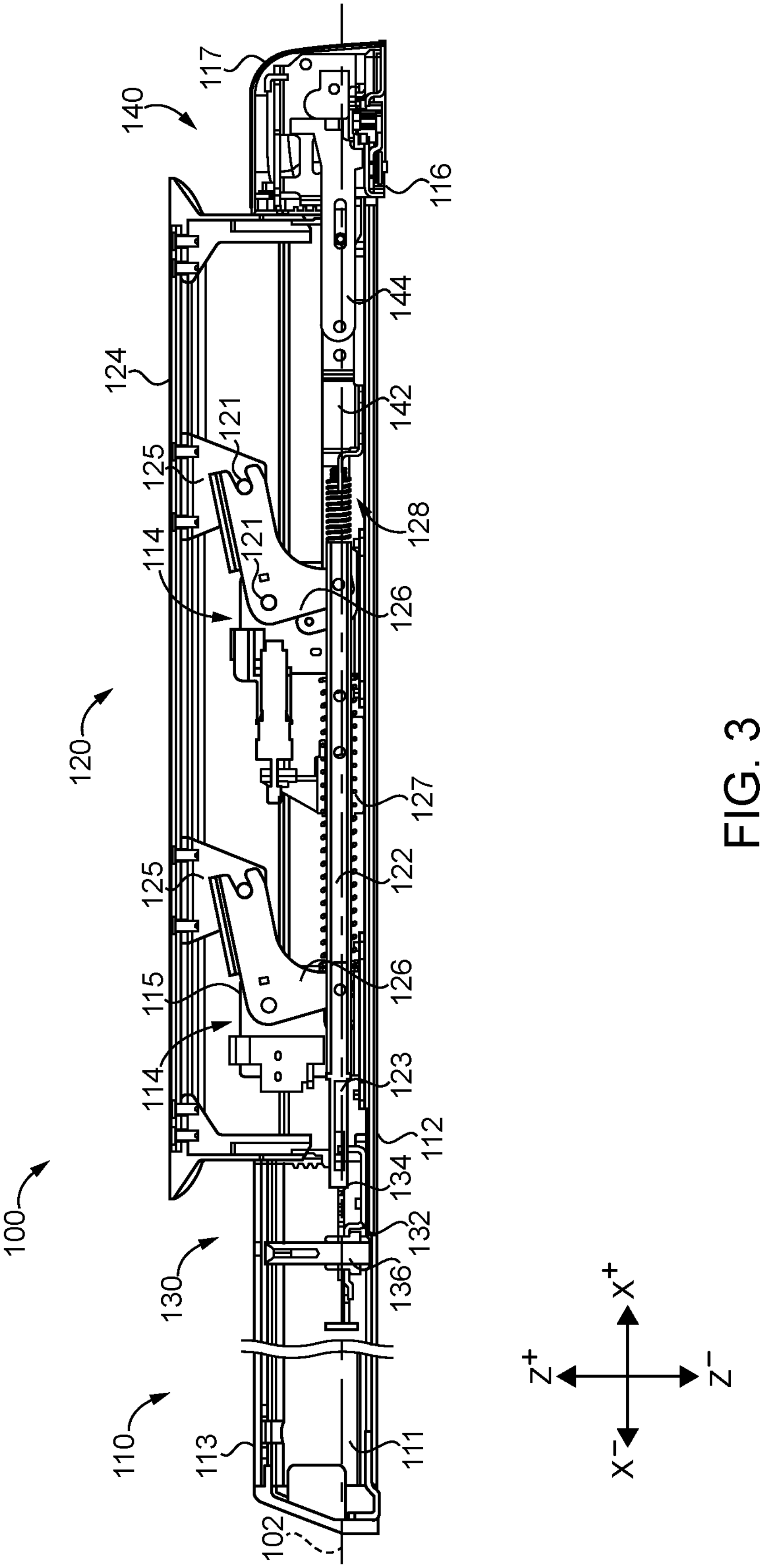
FIG. 3 is a cross-sectional view of the pushbar assembly illustrated in FIG. 1.

With additional reference to FIG. 3, the mounting assembly 110 generally includes an elongated channel member 111, a base plate 112 mounted in the channel member 111, and a pair of bell crank mounting brackets 114 coupled to the base plate 112. The channel member 111 extends along the longitudinal (X) axis 102, has a width in the lateral (Y) directions, and has a depth in the transverse (Z) directions. Each of the mounting brackets 114 includes a pair of laterally-spaced walls 115 that extend away from the base plate 112 in the forward ($Z^+$) direction. The illustrated mounting assembly 110 also includes a faceplate 113 that encloses a distal end portion of the channel member 111, a header plate 116 positioned adjacent a proximal end of the channel member 111, and a header casing 117 mounted to the header plate 116.

The drive assembly 120 includes a drive rod 122 extending along the longitudinal axis 102, a pushbar 124 having a pair of pushbar brackets 125 mounted to the rear side thereof, and a pair of bell cranks 126 operably connecting the drive rod 122 with the pushbar 124. As described herein, the drive rod 122 is mounted for movement in the longitudinal (X) directions, the pushbar 124 is mounted form movement in the transverse (Z) directions, and the bell cranks 126 couple the drive rod 122 and the pushbar 124 for joint movement during actuation and deactuation of the drive assembly 120. Each bell crank 126 is pivotably mounted to a corresponding one of the bell crank mounting brackets 114, and includes a first arm that is pivotably connected to the drive rod 122, and a second arm that is pivotably connected to a corresponding one of the pushbar brackets 125. The pivotal connections may, for example, be provided by pivot pins 121. The drive assembly 120 further includes a return spring 127 that is engaged with the mounting assembly 110 and which biases the drive assembly 120 toward its deactuated state. The drive assembly 120 may further include a lost motion connection 128 through which the drive rod 122 is operably connected to the latch control assembly 140. In such forms, the lost motion connection 128 may include a spring longitudinally urging the drive rod 122 and the latch control assembly 140 away from one another.

Each of the drive rod 122 and the pushbar 124 has an actuated position in the actuated state of the drive assembly 120, and a deactuated position in the deactuated state of the drive assembly 120. During actuation and deactuation of the drive assembly 120, the drive rod 122 moves in the longitudinal (X) directions between a proximal deactuated position and a distal actuated position, and the pushbar 124 moves in the transverse (Z) directions between a projected or forward deactuated position and a depressed or rearward actuated position. Thus, during actuation of the drive assembly 120, the drive rod 122 moves in the distal ($X^-$) direction, and the pushbar 124 moves in the rearward ($Z^-$) direction. Conversely, during deactuation of the drive assembly during actuation of the drive assembly 120, and moves in the proximal (X+) direction during deactuation of the drive assembly 120. The bell cranks 126 translate longitudinal movement of the drive rod 122 to transverse movement of the pushbar 124, and translate transverse movement of the pushbar 124 to longitudinal movement of the drive rod 122. Thus, the longitudinal movement of the drive rod 122 and the transverse movement of the pushbar 124 are coordinated with one another by the bell cranks 126.

With the drive assembly 120 in its deactuated state, a user may depress the pushbar 124 to transition the drive assembly 120 to its actuated state. As the pushbar 124 is driven toward its depressed position, the bell cranks 126 translate the movement of the pushbar 124 in the rearward ($Z^-$) direction to movement of the drive rod 122 in the distal ($X^-$) direction, thereby compressing the return spring 127. When the actuating force is subsequently removed from the pushbar 124, the spring 127 returns the drive rod 122 to its proximal position, and the bell cranks 126 translate the movement of the drive rod 122 in the proximal ($X^+$) direction to movement of the pushbar 124 in the forward ($Z^+$) direction, thereby returning the drive assembly 120 to its deactuated state.

The dogging mechanism 130 is operable to selectively retain the drive assembly 120 in its actuated state, thereby dogging the drive assembly 120. The dogging mechanism 130 is mounted in the channel member 111, and generally includes a base plate 132, a hook 134 pivotably mounted to the base plate 132, and a post 136 rotationally coupled with the hook 134. An end portion of the post 136 is aligned with an opening in the face plate 113, and is configured to engage a corresponding tool. For example, the end portion of the post 136 may include a hexagonal opening sized and shaped to receive the tip of a hex key. With the drive assembly 120 in its actuated state, an opening 123 formed at a distal end of the drive rod 122 becomes aligned with the hook 134, and rotation of the post 136 causes the hook 134 to enter the opening 123. In this state, the hook 134 retains the drive rod 122 in its distal position against the biasing force of the return spring 127. As a result, the dogging mechanism 130 retains the drive assembly 120 in its actuated state, thereby dogging the pushbar assembly 100.

Figure 4:
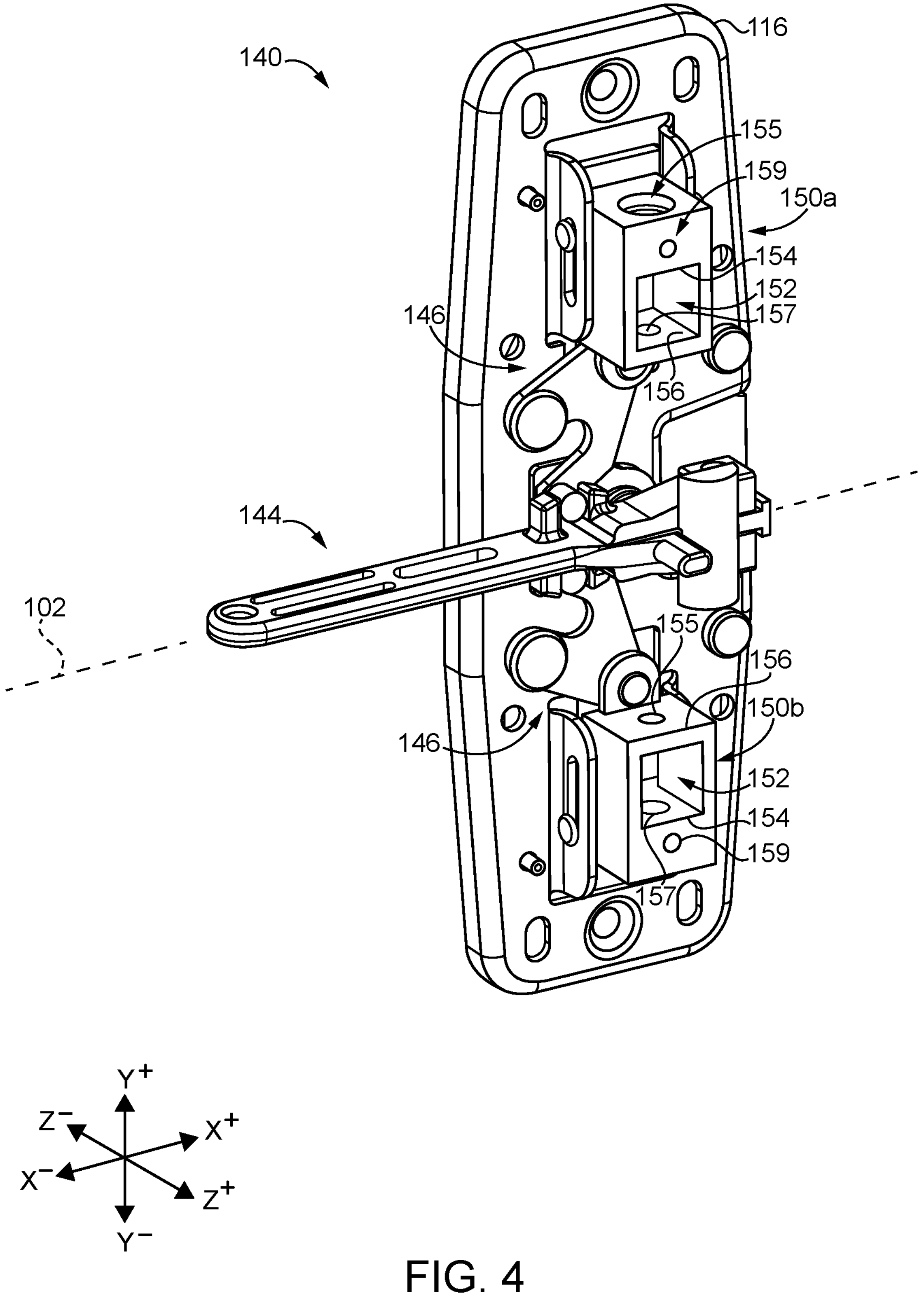
FIG. 4 is a perspective view of a portion of the pushbar assembly illustrated in FIG. 1.

With additional reference to FIG. 4, the latch control assembly 140 generally includes a longitudinally-sliding control link 142, and a yoke 144 that extends along the longitudinal (X) axis 102 and which is coupled with the control link 142, and a pair of pivot cranks 146 that are pivotally mounted to the header plate 116. The latch control assembly 140 further includes a pair of laterally-movable components such as retractor blocks 150, including a first movable component such as upper retractor block 150*a* and a second movable component such as lower retractor block 150*b*, each of which is operably connected with the yoke 144 via a corresponding one of the pivot cranks 146. Each pivot crank 146 includes a first portion that is pivotably connected to the yoke 144, and a second portion that is pivotably connected to a corresponding one of the retractor blocks 150. Additionally, the control link 142 is operably coupled with the drive assembly 120 via the lost motion connection 128 such that actuation of the drive assembly 120 causes a corresponding actuation of the latch control assembly 140.

Each of the control link 142, the yoke 144, the upper retractor block 150*a*, and the lower retractor block 150*b* has a deactuated position in the deactuated state of the latch control assembly 140, and an actuated position in the actuated state of the latch control assembly 140. Each of the control link 142 and the yoke 144 has a proximal deactuated position and a distal actuated position, and moves in the longitudinal (X) directions during actuation and deactuation of the latch control assembly 140. Each retractor block 150 has a laterally-outward deactuated position and a laterally-inward actuated position, and moves in the lateral (Y) directions during actuation and deactuation of the latch control assembly 140.

As used herein, the terms "laterally inward" and "laterally outward" may be used to describe the lateral (Y) directions with reference to the longitudinal (X) axis 102 along which the drive rod 122 and the yoke 144 extend. More specifically, the term "laterally inward" may be used to describe the lateral (Y) direction extending toward the longitudinal (X) axis 102, and the term "laterally outward" may be used to describe the lateral (Y) direction extending away from the longitudinal (X) axis 102. Thus, for the upper retractor block 150*a*, the laterally inward direction is the downward ($Y^-$) direction, and the laterally outward direction is the upward ($Y^+$) direction. For the lower retractor block 150*b*, by contrast, the laterally inward direction is the upward ($Y^+$) direction, and the laterally outward direction is the downward ($Y^-$) direction.

During actuation and deactuation of the latch control assembly 140, the pivot cranks 146 convert longitudinal movement of the yoke 144 to lateral movement of the retractor blocks 150 and vice versa. With the latch control assembly 140 in its deactuated state, actuation of the drive assembly 120 causes the control link 142 and the yoke 144 to move in the distal ($X^-$) direction toward the actuated positions thereof. As the yoke 144 is driven toward its actuated position, the pivot cranks 146 translate the distal movement of the yoke 144 to laterally-inward movement of the retractor blocks 150, thereby driving the retractor blocks 150 to the actuated positions thereof. With the latch control assembly 140 in its actuated state, the lost motion connection 128 may allow the drive assembly 120 to return to its deactuated state without causing a corresponding deactuation of the latch control assembly 140.

During deactuation of the latch control assembly 140, the yoke 144 and the retractor blocks 150 return to the deactuated positions thereof, and the pivot cranks 146 coordinate the proximal movement of the yoke 144 with the laterally-outward movement of the retractor blocks 150. In certain embodiments, the deactuating force may be provided by an internal biasing mechanism of the pushbar assembly 100. For example, the lost motion connection 128 may include a spring that proximally biases the control link 142 away from the drive rod 122. Additionally or alternatively, the deactuating force may be provided by another component of the exit device 90, such as the remote latching assembly 200.

Each retractor block 150 is slidably mounted to the header plate 116 for movement in the lateral (Y) directions. Each retractor block 150 includes an opening 152 that extends through the block 150 in the transverse (Z) directions, and which is partially delimited by a laterally-outward first wall 154 and a laterally-inward second wall 156. A first lateral bore 155 extends laterally through the first wall 154, and is aligned with a second lateral bore 157 formed in the second wall 156. Each retractor block 150 also includes a transverse bore 159, which in the illustrated embodiment is positioned laterally outward of the opening 152. Additionally, each of the first lateral bore 155 and the transverse bore 159 is internally threaded.

Figure 5:
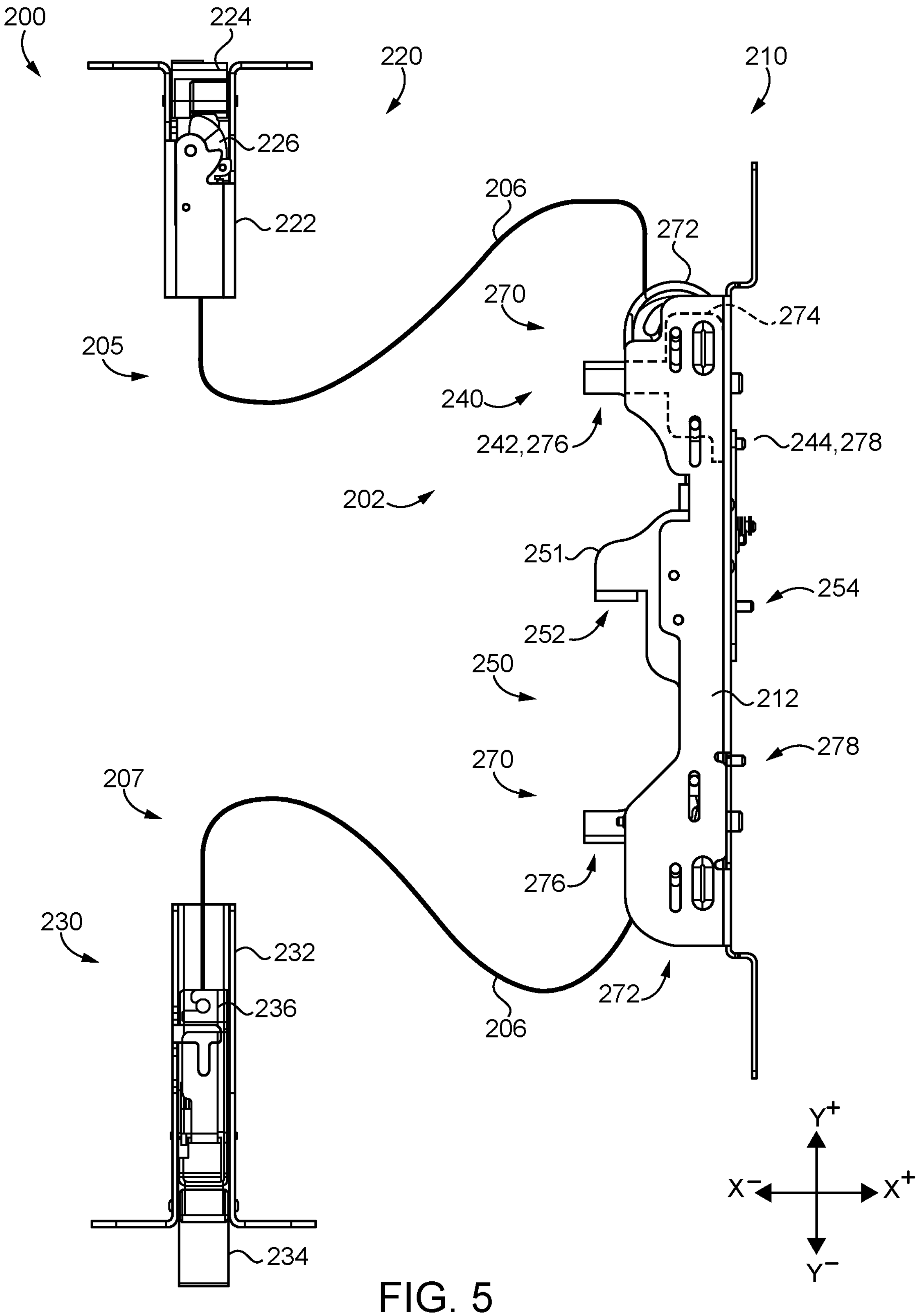
FIG. 5 is a plan view of the remote latching assembly illustrated in FIG. 1.

With additional reference to FIG. 5, the transmission assembly 210 includes the upper transmission 240, the lower transmission 250, and a housing 212 to which the transmissions 240, 250 are mounted for movement in the lateral (Y) directions. Each of the upper transmission 240 and the lower transmission 250 has a laterally-outward deactuated position and a laterally-inward actuated position, and moves in the lateral (Y) directions during actuation and deactuation thereof. The upper transmission 240 is operably connected with the upper latch mechanism 220 via the upper connector 205, and the lower transmission 250 is operably connected with the lower latch mechanism 230 via the lower connector 207.

In the illustrated embodiment, each of the upper connector 205 and the lower connector 207 includes a flexible cable 206, and the adjustment mechanism 202 includes a pair of spool mechanisms 270. Each of the spool mechanisms 270 is included in a respective one of the upper transmission 240 and the lower transmission 250, and is associated with the connector 205/207 corresponding to the respective transmission 240/250. Each spool mechanism 270 includes a spool 272 that is coupled to a laterally-inward end portion of the cable 206 of the corresponding connector 205/207, a body 274 to which the spool 272 is rotatably mounted, an arm 276 extending distally from the body 274, and a post 278 extending from a proximal side of the body 274. Rotation of the spool 272 in one direction causes the cable 206 to wind onto the spool 272, whereas rotation of the spool 272 in the opposite direction causes the cable 206 to unwind from the spool 272. Thus, each of the spool mechanisms 270 is operable to adjust the effective length of the corresponding connector 205/207. The spool mechanism 270 may further include a locking mechanism operable to selectively retain the position of the spool 272 when a desired effective length has been achieved.

The upper latch mechanism 220 generally includes a housing 222, a latchbolt 224 mounted to the housing 222 for movement between a latching position and an unlatching position, and a blocking member 226 mounted to the housing 222 for movement between a blocking position and an unblocking position. The upper latch mechanism 220 also includes a biasing member urging the blocking member 226 toward the blocking position, in which the blocking member 226 retains the latchbolt 224 in the latching position. The blocking member 226 is coupled to an upper end portion of the upper connector 205, such that the blocking member 226 moves toward the unblocking position in response to movement of the upper connector in the downward or laterally-inward direction. With the blocking member 226 in the unblocking position, the latchbolt 224 is capable of moving to the unlatching position, in which the latchbolt 224 retains the blocking member 226 in its unblocking position. When the latchbolt 224 returns to the latching position, the biasing member returns the blocking member 226 to its blocking position, thereby causing movement of the upper connector 205 in the upward or laterally-outward direction.

The lower latch mechanism 230 generally includes a housing 232, a deadbolt 234 mounted to the housing 232 for movement between an extended position and a retracted position, a traveler 236 movably mounted to the housing 232, and a biasing member urging the traveler in the downward or laterally-outward direction. The traveler 236 is engaged with the deadbolt 234 such that an externally-applied pushing force exerted on the bottom of the deadbolt 234 drives the traveler 236 into engagement with the housing 232, thereby preventing further laterally-inward movement of the deadbolt 234. The traveler 236 is coupled to a lower end portion of the lower connector 207 such that the traveler 236 retracts the deadbolt 234 in response to movement of the lower connector 207 in the upward or laterally-inward direction. When the lower connector 207 subsequently becomes free to move in the laterally-outward direction, the biasing member drives the traveler 236 downward. Such downward movement of the traveler 236 drives the deadbolt 234 to the extended position, and causes a corresponding downward or laterally-outward movement of the lower connector 207.

The upper transmission 240 is coupled to a lower end portion of the upper connector 205, and includes a distally-extending ledge 242 and a proximally-extending lug 244. In the illustrated embodiment, the upper transmission 240 includes the spool mechanism 270 coupled to the upper connector 205, and the ledge 242 and lug 244 are respectively defined by the arm 276 and post 278 of the spool mechanism 270.

The lower transmission 250 is coupled to an upper end portion of the lower connector 207, and includes a distally-extending ledge 252 and a proximally-extending lug 254. In the illustrated embodiment, the lower transmission 250 includes the spool mechanism 270 coupled to the lower connector 207, and further includes a linkage 251 that is coupled to the spool mechanism 270. The linkage 251 includes an arm that defines the ledge 252, and a post that defines the lug 254.

Figure 6:
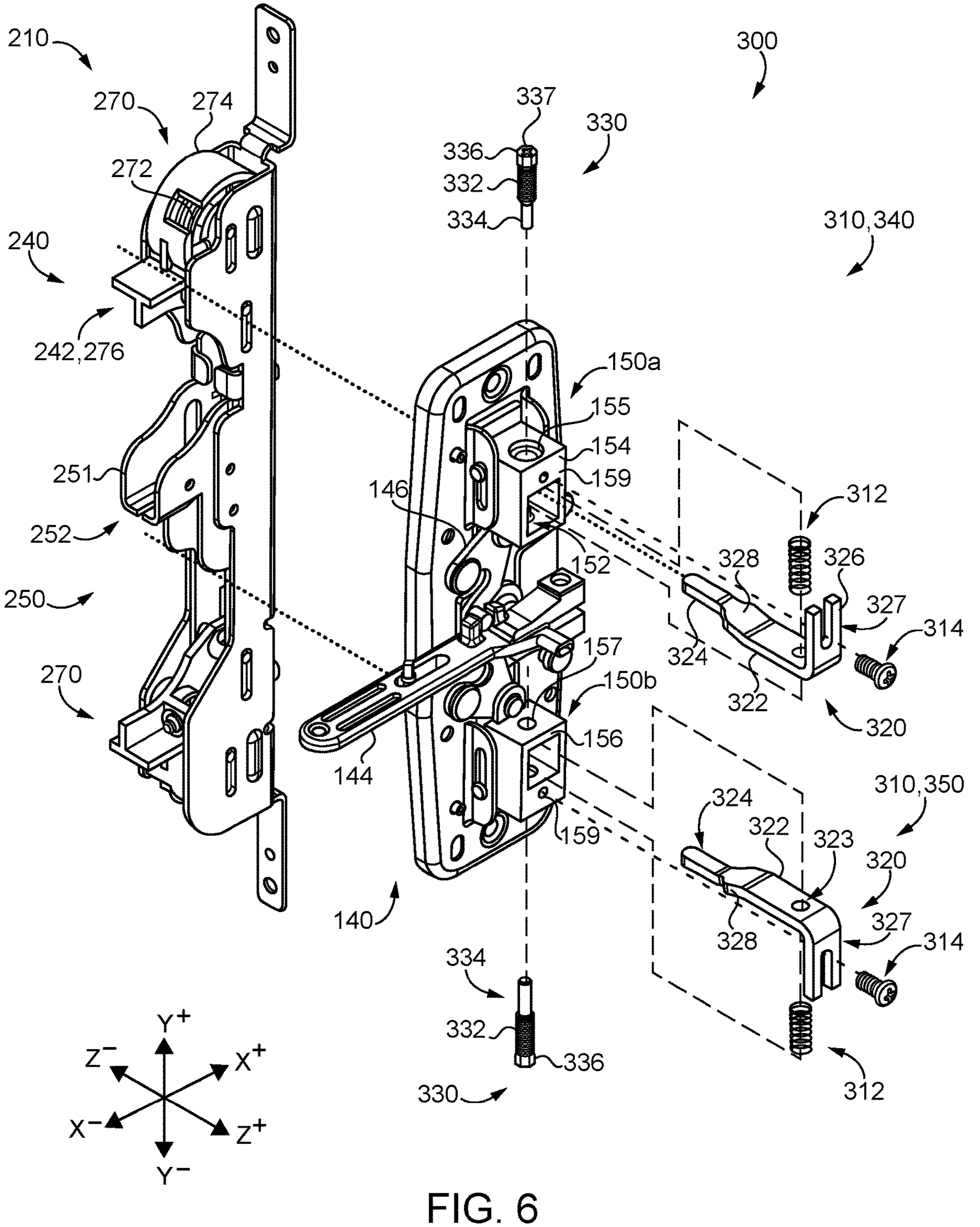
FIG. 6 is a partially exploded assembly view of selected components of the exit device illustrated in FIG. 1.

With additional reference to FIG. 6, the illustrated self-adjusting coupling assembly 300 includes a pair of self-adjusting coupling mechanisms 310, including an upper coupling mechanism 340 and a lower coupling mechanism 350. As noted above, each coupling mechanism 310 generally includes a spring 312, a lift finger 320 engaged with the spring 312, a releasable fastener such as a screw 314 that selectively retains the position of the lift finger 320 relative to a corresponding one of the retractor blocks 150, and a post 330 extending through the spring 312 and the lift finger 320. Additionally, each coupling mechanism 310 provides a self-adjusting coupling between the latch control assembly 140 and the transmission assembly 210. More specifically, the upper coupling mechanism 340 provides a self-adjusting coupling between the upper retractor block **150*a* and the upper transmission 240, and the lower coupling mechanism 350 provides a self-adjusting coupling between the lower retractor block 150*b* and the lower transmission 250. Further details regarding the self-adjusting nature of the coupling mechanism 310** are provided below.

The lift finger 320 includes a body portion 322, an end portion 324 extending from a first side of the body portion 322, and a flange 326 extending from an opposite second side of the body portion 322. The body portion 322 includes an aperture 323 through which a portion of the post 330 extends. The flange 326 is angled with respect to the body portion 322, and in the illustrated form is substantially perpendicular to the body portion 322. The flange 326 includes a slot 327 sized and configured to receive a portion of the screw 314. The lift finger 320 may further include an angled portion 328 between the body portion 322 and the end portion 324 such that the end portion 324 is offset from the body portion 322 in the direction in which the flange 326 extends from the body portion 322.

The post 330 includes a first portion 332, a second portion 334 extending from one end of the first portion 332, and a head 336 formed at the other end of the first portion 332. The first portion 332 is configured to be received in the first lateral bore 155, and the second portion 334 is configured to extend through the aperture 323 and into the second lateral bore 157. In the illustrated form, the first portion 332 is threaded, and the second portion 334 is unthreaded and has a lesser diameter than the first portion 332. The head 336 includes an engagement feature 337 configured to engage a corresponding tool with which the post 330 can be rotated. In the illustrated embodiment, the engagement feature 337 is provided as a cross-shaped cavity sized and shaped to receive and engage a Phillips-head bit. In other embodiments, the engagement feature 337 may be provided in another form, such as a hexagonal cavity sized and shaped to receive and engage a hex key.

With the coupling mechanism 310 mounted to the corresponding one of the retractor blocks 150, the lift finger 320 extends through the opening 152, the flange 326 is adjacent the face of the block **150*a*, and the slot 327 is aligned with the transverse bore 159. The spring 312 is positioned between the body portion 322 and the laterally outward first wall 154, and biases the lift finger 320 in the laterally inward direction and toward the second wall 156. The threaded portion 332 of the post 330 is engaged with the internal threads of the first lateral bore 155, and the unthreaded portion 334 extends through the spring 312 and the aperture 323 and into the second lateral bore 157**.

When the coupling mechanism 310 is secured to the corresponding one of the retractor blocks 150, the screw 314 extends into the transverse bore 159 via the slot 327 such that the flange 326 is clamped between the head of the screw 314 and the face of the block 150. When the screw 314 is loosened or removed, the lift finger 320 is capable of sliding along the post 330, and is biased in the laterally inward direction by the spring 312. In this state, the post 330 constrains the lift finger 320 to movement in the lateral (Y) directions, and the walls 154, 156 constrain the movement of the lift finger 320 in the lateral (Y) directions. The screw 314 may then be installed and/or tightened to secure the lift finger 320 to the retractor block 150, thereby fixing the lift finger 320 in a desired position relative to the block 150.

With additional reference to FIG. 7, illustrated therein are portions of the door 70 and the exit device 90 with the exit device 90 partially installed to the door 70. In the interest of clarity, certain elements and features are omitted from FIG. 7, including the pushbar assembly 100, the connectors 205, 207, and various components of the coupling mechanisms 310. The transmission assembly 210 is mounted in the center cavity 84 such that the ledges 242, 252 are aligned with the openings 81 in the interior side surface 71 of the door 70. As described herein, each lift finger 320 extends through and is coupled to a corresponding one of the retractor blocks 150, such that the lift fingers 320 move laterally with the retractor blocks 150. The lift fingers 320 also extend through the openings 81, and are engaged with the transmissions 240, 250. More specifically, the end portion 324 of each lift finger 320 is engaged with the laterally-outward side of the ledge 242, 252 of the corresponding transmission 240, 250. For example, the end portion 324 of the first or upper lift finger 320 is engaged with an upper surface of the ledge 242 of the upper transmission 240. Similarly, the end portion 324 of the second or lower lift finger 320 is engaged with a lower surface of the ledge 252 of the lower transmission 250.

In the illustrated embodiment, each lift finger 320 is engaged with the corresponding transmission 240, 250 for unidirectional transmission of pushing forces. More specifically, each of the lift fingers 320 is capable of pushing the corresponding transmission 240/250 laterally inward, but cannot pull the corresponding transmission 240/250 laterally outward. Conversely, each of the transmissions 240, 250 is capable of pushing the corresponding lift finger 320 laterally outward, but cannot pull the corresponding lift finger 320 laterally inward. In other embodiments, one or both of the lift fingers 320 may be engaged with the corresponding transmission 240/250 for bidirectional transmission of forces.

During actuation of the latch control assembly 140, the lift fingers 320 translate the laterally inward movement of the retractor blocks 150 to a corresponding laterally inward movement of the transmissions 240, 250. Laterally inward movement of the transmissions 240, 250 causes a corresponding laterally inward movement of the connectors 205, 207, thereby actuating the latch mechanisms 220, 230. When the latch mechanisms 220, 230 are subsequently deactuated, the biasing mechanisms thereof drive the connectors 205, 207 laterally outward, thereby causing corresponding laterally outward movement of the transmissions 240, 250. In the event that the latch control assembly 140 has not yet returned to its deactuated state, such lateral outward movement of the transmissions 240, 250 may drive the lift fingers 320 and the retractor blocks 150 laterally outward, thereby deactuating the latch control assembly 140.

As will be appreciated, should one or both of the lift fingers 320 be installed at an improper position relative to the corresponding transmission 240/250, the functioning of the exit device 90 may suffer. By way of example, if the upper lift finger 320 is secured to the upper retractor block **150*a* at an improperly low position, the upper transmission 240 may be prevented from returning to its deactuated position. This may result in a "failure-to-secure" condition, in which the upper latch mechanism 220 remains in its deactuated state, and therefore does not latch the door 70 in its closed position. A similar failure-to-secure condition may occur should the lower lift finger 320 be secured to the lower retractor block 150*b* at an improperly high location. In such a case, the lower transmission 250 may be unable to fully return to its deactuated position, thereby preventing the deadbolt 234** from moving to its extended position.

As another example, if the upper lift finger 320 is secured to the upper retractor block **150*a* at an improperly high position, actuation of the latch control assembly 140 may fail to fully drive the upper transmission 240 to its actuated position. This may result in an "failure-to-egress" condition, in which the upper latch mechanism 220 cannot be actuated by the pushbar assembly 100, and opening of the door 70 is prevented. A similar failure-to-egress condition may occur should the lower lift finger 320 be secured to the lower retractor block 150*b* at an improperly low location. Improper positioning of the lower lift finger 320 may alternatively cause the deadbolt 234 to remain partially extended when full retraction is desired, which may cause the deadbolt 234 to drag along the floor during movement of the door 70**.

As is evident from the foregoing, the proper positioning of the lift fingers 320 can be an important factor in ensuring the proper functioning of the exit device 90. The systems and methods described herein facilitate the mounting of the lift fingers 320 in the proper locations, thereby simplifying the process of installing the exit device 90 and obviating the deleterious effects of improper positioning.

With additional reference to FIGS. 8-17, further details will now be provided regarding a process according to certain embodiments. An example of a process 400 for installing a lift finger to a partially-installed exit device is illustrated in FIG. 8, and FIGS. 9-17 illustrate portions of the exit device 90 during various stages of a particular implementation of the process 400. For purposes of illustration, the process 400 is described herein as involving the installation of at least one of the self-adjusting coupling mechanisms 310 to the above-described exit device 90. It is to be appreciated, however, that the principles described herein may be applied to other forms of exit devices. Furthermore, while certain descriptions herein are made with reference to the installation of the upper coupling mechanism 340, those skilled in the art will readily appreciate that similar operations may be performed to install the lower coupling mechanism 350 in addition or as an alternative to the upper coupling mechanism 340.

In certain embodiments, the process 400 begins with the exit device 90 in a partially-installed state, in which the pushbar assembly 100 and the remote latching assembly 200 have been installed to the door 70, but have not yet been operably connected to one another. In the pushbar assembly 100, the header case 117 has not yet been mounted to the header plate 116, such that the interior side surface openings 81 are accessible via the retractor block openings 152. In the remote latching assembly 200, each of the transmission assembly 210, the upper latch mechanism 220, and the lower latch mechanism 230 has been mounted in the appropriate cavity 84, 86, 88, but the faceplate 204 has not yet been installed to the free edge 74 of the door 70. As a result, the proximal side of the transmission assembly 210, including the lugs 244, 254, remains exposed. Additionally, each transmission 240, 250 has been connected to the corresponding latch mechanism 220/230 via the corresponding connector 205/207, and coarse adjustment of the connectors 205, 207 has been performed by removing slack from the cables 206 using the spool mechanisms 270.

Figure 11:
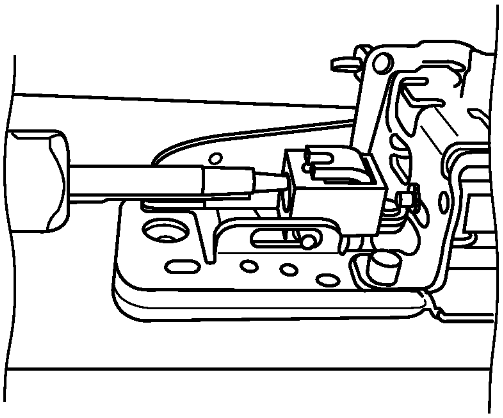
FIGS. 9-17 illustrate the exit device illustrated in FIG. 1 during various stages of the process illustrated in FIG. 8.
Figure 10:
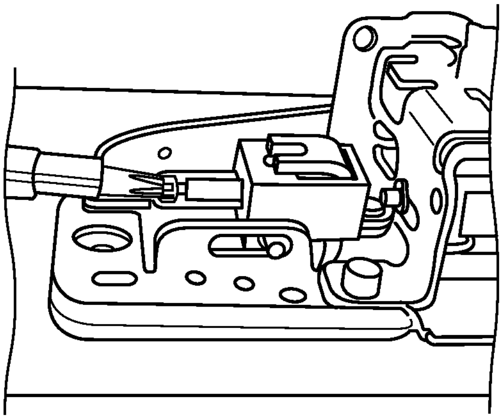
Figure 9:
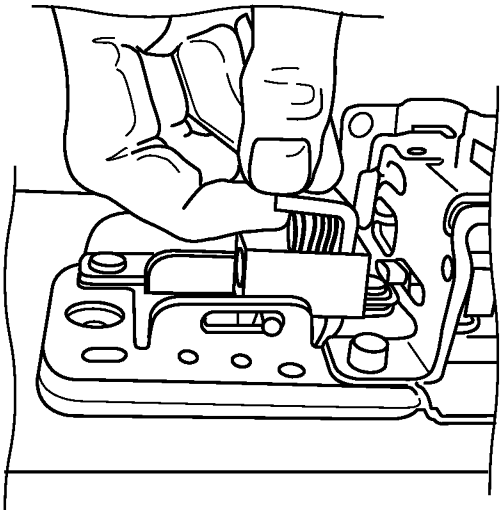

The process 400 includes a procedure 410, in which the coupling mechanism 310 is provisionally mounted to the corresponding retractor block 150. FIGS. 9-11 illustrate an implementation of the procedure 410, which involves provisionally mounting the upper coupling mechanism 340 to the upper retractor block **150*a*. The procedure 410 may additionally or alternatively involve provisionally mounting the lower coupling mechanism 350 to the lower retractor block 150*b***.

The procedure 410 may begin with an operation 412, in which the spring 312 and the lift finger 320 are inserted into the opening 152. The operation 412 includes placing the lift finger 320 in a position in which the aperture 323 is generally aligned with the lateral bores 155, 157, and the end portion 324 is positioned laterally outward of the corresponding ledge 242/252. For example, in embodiments in which the upper coupling mechanism 340 is utilized, the end portion 324 of the upper lift finger 320 is positioned above the ledge 242 of the upper transmission 240. In embodiments in which the lower coupling mechanism 350 is utilized, the end portion 324 of the lower lift finger 320 is positioned below the ledge 252 of the lower transmission 250. The operation 412 also includes placing the spring 312 between the body portion 322 and the laterally outward first wall 154 such that the spring 312 biases the lift finger 320 in the laterally inward direction. FIG. 9 illustrates an implementation of the operation 412 in which the lift finger 320 and spring 312 of the upper coupling mechanism 340 are inserted to the opening 152 of the upper retractor block 150*a*.

The procedure 410 may continue to an operation 414, in which the post 330 is installed. The operation 414 includes inserting the post 330 into the first lateral bore 155. The post 330 is then rotated to advance the threaded portion 332 within the threaded bore 155, thereby causing the unthreaded portion 334 to extend through the spring 312 and aperture 323 and into the second lateral bore 157. FIGS. 10 and 11 illustrate an implementation of the operation 414 in which the post 330 of the upper coupling mechanism 340 is initially inserted into the first lateral bore 155 (FIG. 10), and subsequently advanced to its final position (FIG. 11).

The process 400 also includes a procedure 420, in which the transmission assembly 210 is releasably fixed in a predetermined state. In the illustrated embodiment, the predetermined state of the transmission assembly 210 is one in which each of the upper transmission 340 and the lower transmission 350 has predetermined position relative to a predetermined frame of reference, such as the housing 212. The procedure 420 may include an operation 422, which generally involves placing each of the upper transmission 240 and the lower transmission 250 in a predetermined position. The predetermined position for each transmission 240, 250 may, for example, be the position that it is optimal or desired for the transmission to occupy when the latch control assembly 140 is in its actuated state. In other words, the predetermined position for the transmissions 240, 250 may be an optimal or desired actuated position.

Figure 13:
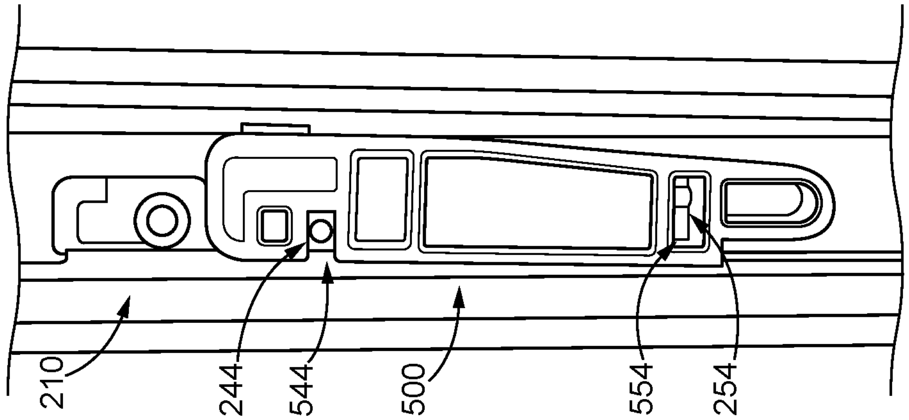
Figure 12:
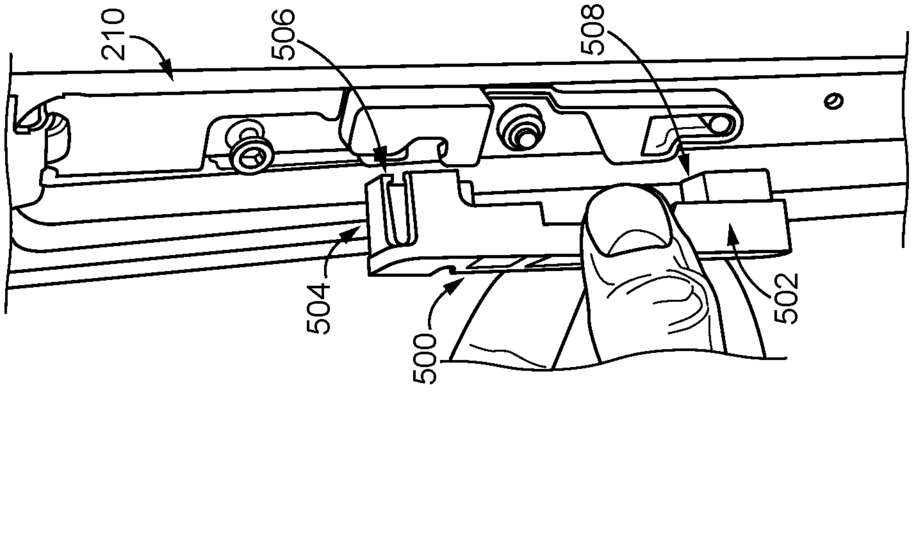

With additional reference to FIGS. 12 and 13, the operation 422 may include mounting a fixture 500 to the transmission assembly 210 such that the fixture 500 retains the transmissions 240, 250 in the predetermined positions thereof. In the illustrated form, the fixture 500 includes one or more alignment features 502 configured to engage a portion of the transmission assembly 210 having a relatively fixed position, and one or more retention features 504 configured to releasably engage the transmission assembly 210. The alignment and retention features 502, 504 may, for example, be provided in the form of one or more spring clips 506 and/or one or more protrusions 508. The illustrated fixture 500 also includes an upper slot 544 configured to receive the upper lug 244, and a lower slot 554 configured to receive the lower lug 254.

The alignment features 502, retention features 504, upper slot 544, and lower slot 554 are positioned such that the fixture 500, when installed, retains the transmission assembly 210 in the transmission assembly predetermined state. More specifically, with the lugs 244, 254 received in the slots 544, 554, each of the upper transmission 240 and the lower transmission 250 is retained in the predetermined position thereof. The fixture 500 may further include features that facilitate the insertion of the lugs 244, 254 into the slots 544, 554. For example, tapered inlets may be provided for each of the slots 544, 554. In the event that the upper transmission 240 and/or the lower transmission 250 is slightly offset from the predetermined position thereof, such tapered inlets may direct the misaligned lug 244/254 into the corresponding slot 544/554 during mounting of the fixture 500, thereby driving the misaligned transmission 240/250 to the predetermined position thereof.

In the illustrated embodiment, the predetermined state of the transmission assembly 210 includes predetermined positions of the upper and lower transmissions 240, 250, and the procedure 420 involves placing each transmission 240, 250 in the predetermined position thereof. It is also contemplated that the procedure 420 may involve placing a single transmission in a predetermined position, for example in embodiments in which the exit device includes a single remote latching mechanism and/or a single transmission.

Figure 15:
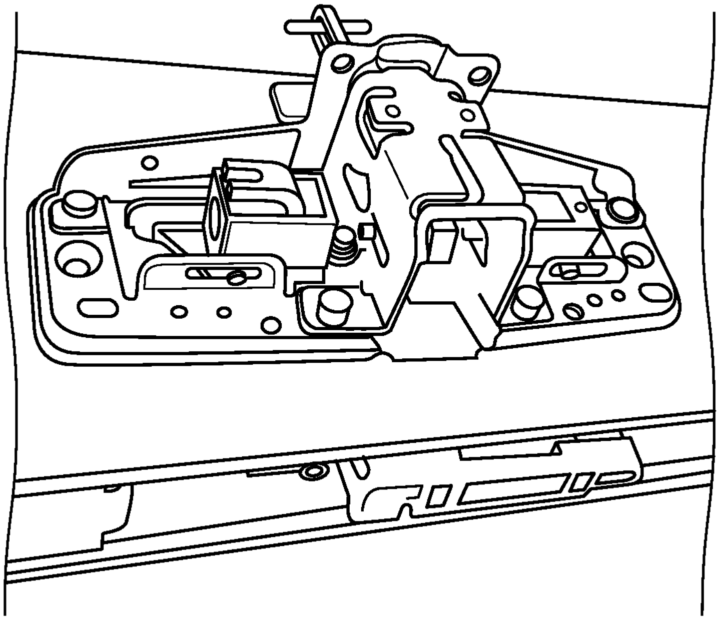
Figure 14:
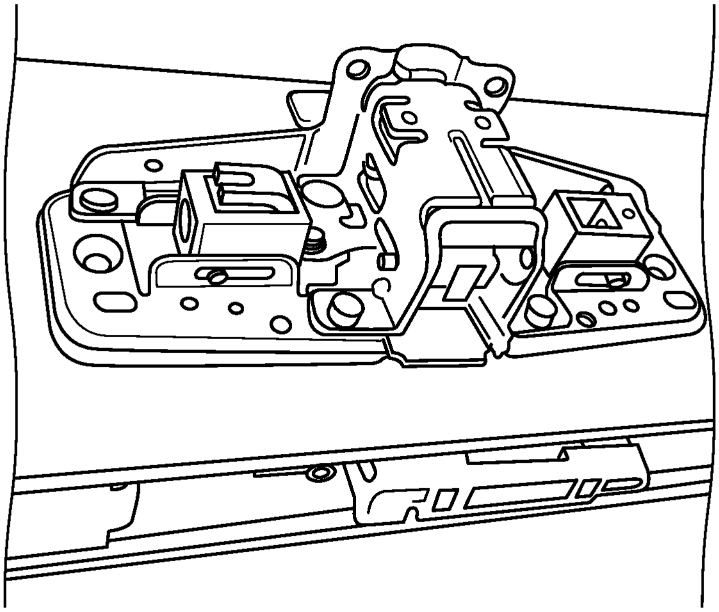

The process 400 also includes a procedure 430, in which the latch control assembly 140 is maintained in its actuated state. An implementation of the procedure 430 is illustrated in FIGS. 14 and 15. In the illustrated form, the procedure 430 includes an operation 432, which involves depressing the pushbar 124, thereby actuating the drive assembly 120. Actuation of the drive assembly 120 moves the latch control assembly 140 to its actuated state in the manner described above. The procedure 430 may further include an operation 434, in which the dogging mechanism 130 is actuated, thereby dogging the pushbar assembly 100 with the drive assembly 120 and latch control assembly 140 in the actuated states thereof. Alternatively, the operation 434 may be omitted, and the actuated state of the latch control assembly 140 may be maintained in another manner, such as by manually retaining the pushbar 124 in its depressed position.

With the procedures 410, 420, 430 completed, the latch control assembly 140 is in its actuated state, and each of the transmissions 240, 250 is in the predetermined position thereof. Additionally, the biasing force exerted by the spring 312 drives the lift finger 320 into engagement with the ledge 242/252 of the corresponding transmission 240/250, thereby eliminating slack and/or lost motion. Thus, the self-adjusting coupling mechanism 310 provides the lift finger 320 with the proper position relative to the retractor block 150 without requiring further adjustment by the installer.

In certain embodiments, the predetermined position for each transmission 240, 250 may be the position that it is desired for the transmission to occupy in response to the actuated state of the latch control assembly 140. Additionally or alternatively, the predetermined positions may be selected based upon a desired set of characteristics and/or features. For example, the predetermined positions may be selected such that during actuation of the exit device 90, actuation of the bottom latch mechanism 230 occurs prior to actuation of the upper latch mechanism 220 while retaining some travel in the center case as a margin of safety.

Figure 16:
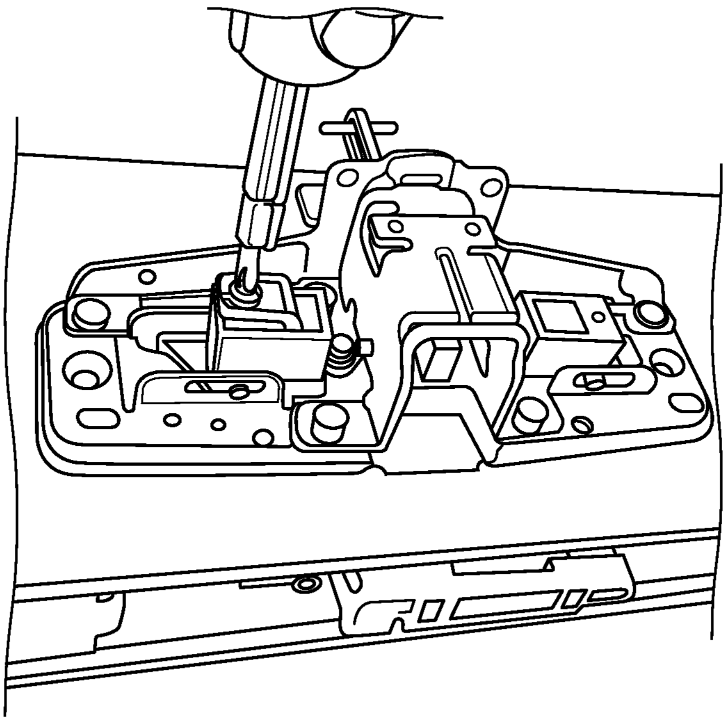

After completing the procedures 410, 420, 430, the process 400 may continue to a procedure 440, in which the lift finger 320 is secured to the retractor block 150 while in the proper position. In the illustrated form, the procedure 440 involves threading the screw 314 into the transverse bore such that the flange 326 is clamped between the head of the screw 314 and the face of the block 150*a*. With the screw 314 tightened, the lift finger 320 is secured in the proper position relative to the retractor block 150. FIG. 16 illustrates an implementation of the procedure 440 in which the lift finger 320 of the upper coupling mechanism 340 is secured to the upper retractor block 150*a*.

Figure 17:
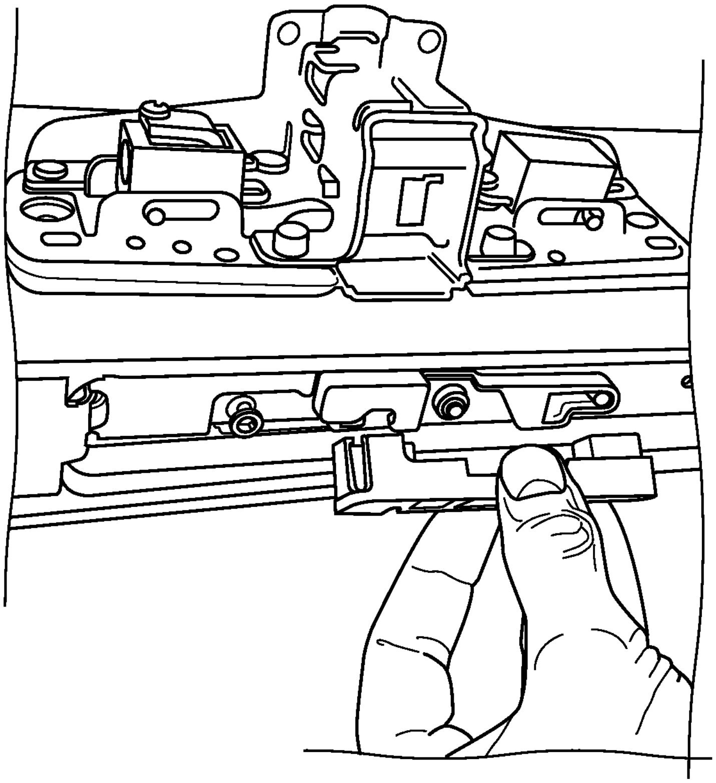

Following the procedure 440, the process 400 may proceed to an operation 450, in which the fixture 500 is removed, for example as illustrated in FIG. 17. The operation 450 may further include deactuating the dogging mechanism 130, thereby undogging the exit device 90. The pushbar 124 may then be depressed to ensure that the remote latching assembly 200 functions properly in response to actuation of the pushbar assembly 100. Upon validating proper functioning, the process 400 may be complete.

Figure 8:
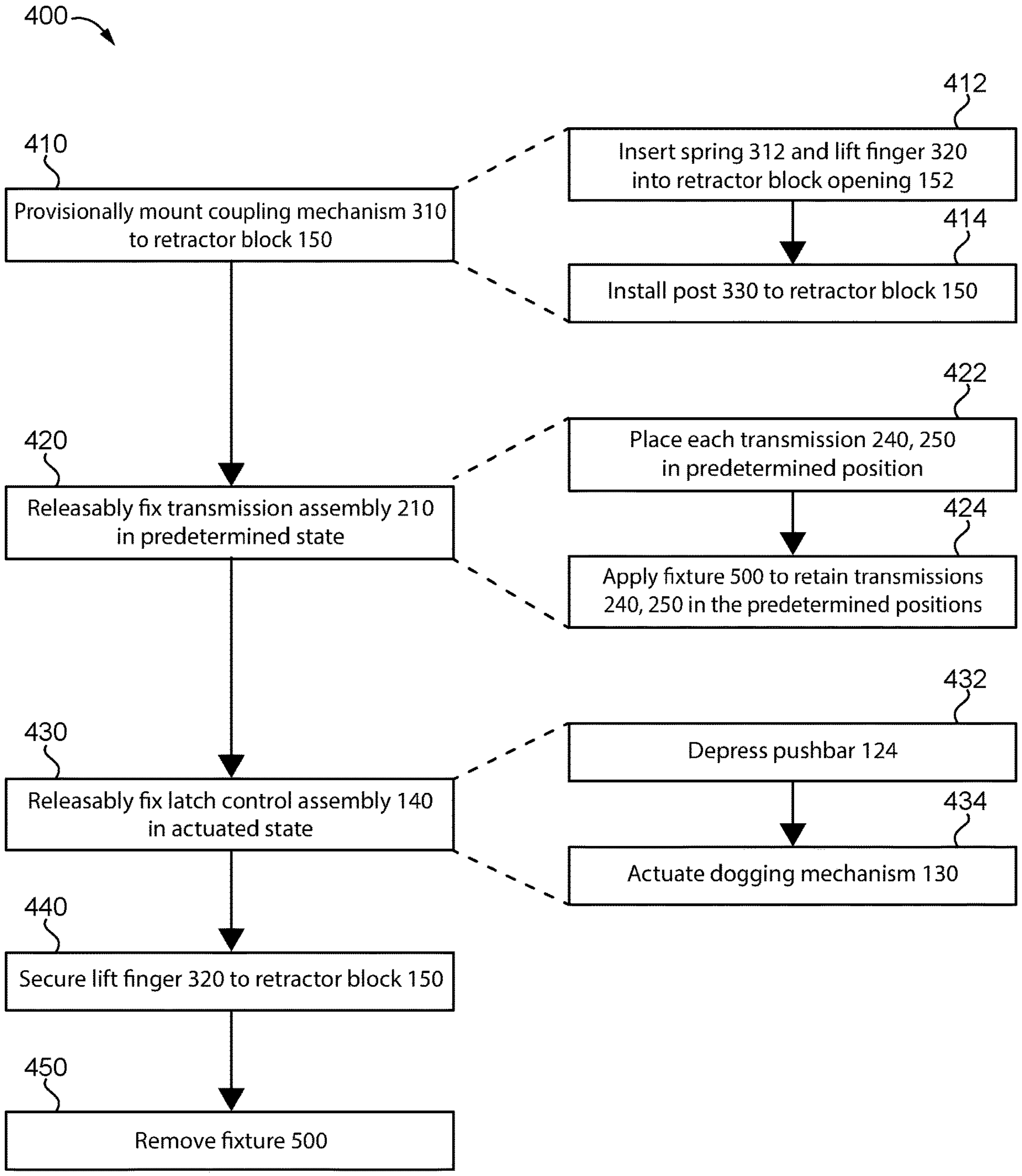
FIG. 8 is a schematic flow diagram of a process according to certain embodiments, which process may be utilized in connection with the exit device illustrated in FIG. 1.

It is to be appreciated that the operations and procedures described above with reference to the process 400 are examples only, and that operations may be combined or divided, and added or removed, as well as re-ordered in whole or in part, unless explicitly stated to the contrary. For instance, while FIG. 8 illustrates a particular sequence for the procedures 410, 420, 430, the procedures 410, 420, 430 need not be performed in this order. By way of illustration, the procedure 420 may be performed prior to the procedure 410, for example should the installer find it more convenient to provisionally mount the coupling assembly 310 to the retractor block 150 after the transmission assembly 210 has been fixed in its predetermined state.

Additionally, while the process 400 is described as beginning with the exit device 90 in a partially-installed state, it is also contemplated that the process 400 may involve performing one or more of the steps that lead to such a partially-installed state. For example, the process 400 may include one or more of the following operations: mounting the pushbar assembly 100 to the door; mounting the transmission assembly 210 in the center cavity 84; mounting the upper latch mechanism 220 in the upper cavity 86; mounting the lower latch mechanism 230 in the lower cavity 88; passing the upper connector 205 through the upper channel 85; passing the lower connector 207 through the lower channel 87; connecting the upper connector 205 to the upper latch mechanism 220 and/or to the upper transmission 240; connecting the lower connector 207 to the lower latch mechanism 230 and/or to the lower transmission 250; operating one or both of the spool mechanisms 270 to remove slack from one or both of the cables 206.

Furthermore, while the process 400 has been described with specific reference to the exit device 90 illustrated in FIGS. 1-7, those skilled in the art will readily appreciate that other embodiments of the process 400 may be utilized in connection with exit devices in which the pushbar assembly and/or the remote latching assembly is provided in another form. As one example, the bottom latch mechanism 230 and lower connector 207 may be omitted from the remote latching assembly 200. In such forms, the procedure 420 may not necessarily involve retaining the lower transmission 250 in a predetermined position. As another example, while the illustrated remote latching assembly 200 is provided as a concealed-type remote latching assembly in which the connectors 205, 207 extend through channels 85, 87 within the door 80, those skilled in the art will readily appreciate that the process 400 may alternatively be used in connection with surface-type remote latching assembly in which the connectors are mounted to the interior side surface 71 of the door 70. Additionally, while the connectors 205, 207 are provided as flexible cables, it is also contemplated that the process 400 may be utilized in connection with exit devices in which the connectors are provided as rigid rods.

Figure 18:
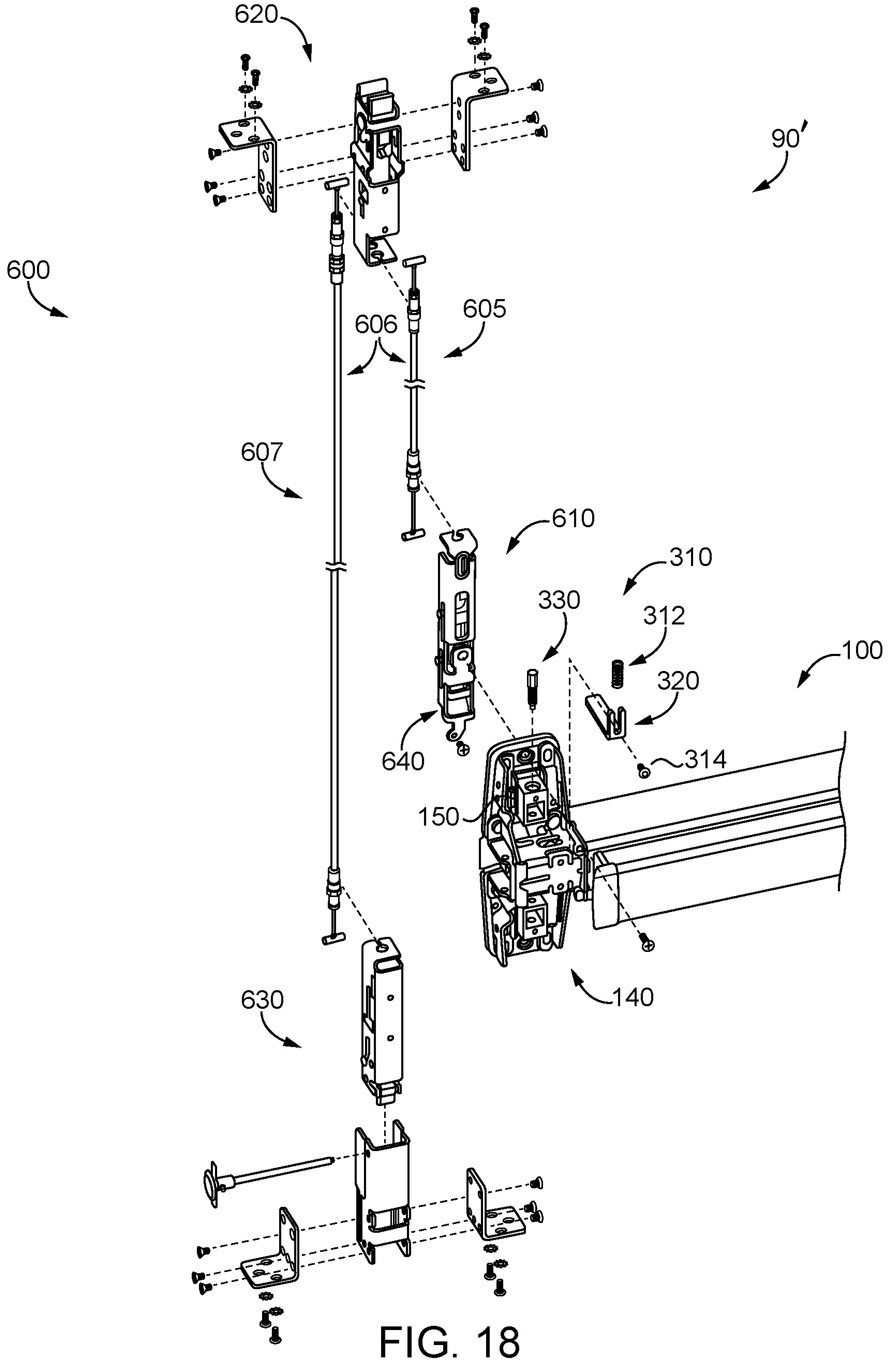
FIG. 18 is a partially-exploded assembly view of an exit device according to certain embodiments.

With reference to FIG. 18, illustrated therein is an exit device 90' according to certain embodiments. Like the above described exit device 90, the exit device 90' includes the pushbar assembly 100, a remote latching assembly 600, and an adjustable coupling mechanism 310 operably connecting the pushbar assembly 100 with the remote latching assembly 600. The remote latching assembly 600 includes certain components analogous to those of the above-described remote latching assembly 200, and similar reference characters are used to indicate analogous elements and features. For example, the remote latching assembly 600 includes a transmission assembly 610, an upper latch mechanism 620, and a lower latch mechanism 630, which respectively correspond to the transmission assembly 210, upper latch mechanism 220, and lower latch mechanism 230 of the remote latching assembly 200. In the interest of conciseness, the following descriptions focus primarily on features of the remote latching assembly 600 that are different from those described above with reference to the remote latching assembly 200.

Like the above-described transmission assembly 210, the transmission assembly 610 includes an upper transmission 640 that is connected to the upper latch mechanism 620 via a first connector 605. However, the transmission assembly 610 does not include a lower transmission connected to the lower latch mechanism 630. Instead, the lower latch mechanism 630 is operably connected with the upper latch mechanism 620 via a second connector 607 such that the transmission assembly 610 and the lower latch mechanism 630 are operably connected to one another via the upper latch mechanism 620. Additionally, while each of the above-described connectors 205, 207 includes a bare cable 206 that transmits pulling forces only, each of the connectors 605, 607 includes a sheathed push/pull cable 606 operable to transmit both pushing and pulling forces.

The remote latching assembly 600 is commercially available in the Von Duprin® 98/9949 series exit device. Further details regarding the illustrated remote latching assembly 600 are found in the following documents, the contents of which are incorporated by reference in their entirety: Von Duprin® Service Manual, 98/9947 & 98/9949 Series Exit Device, Allegion Document ID 105675 Rev. 11/14; Von Duprin® 98/9949 Concealed Vertical Device Installation Instructions, Allegion Document ID 23970734 Rev. 07/16-k.

In commercially-available products including the remote latching assembly 600, the position of the lift finger relative to the upper retractor block 150 must be manually adjusted by the installer. This process can be time-consuming, and requires that the installer make subjective judgments that may lead to variability in the performance of the exit device. By way of example, the adjustment process requires that the installer perform certain actions until perceiving the occurrence of a particular event, such as the release of the upper latch mechanism 620. It has been found that installers have varying opinions on what these events entail, and were therefore adjusting the devices according to different criteria.

In the illustrated exit device 90, the requirement for manual adjustment may be obviated by installing the self-adjusting coupling mechanism 310 in a process similar to the above-described process 400. Of note, the installation instructions for the commercial product indicate that the lift finger adjustment is to be performed while the latch mechanisms 620, 630 are in the extended or deactuated states thereof. Such a requirement may necessitate certain alterations to the above-described process 400, such as the omission of the procedure 430 and the selection of an appropriate predetermined position for the transmission 640. Such alterations will be readily apparent to those skilled in the art, and need not be described in further detail herein.

While the invention has been illustrated and described in detail in the drawings and foregoing description, the same is to be considered as illustrative and not restrictive in character, it being understood that only the preferred embodiments have been shown and described and that all changes and modifications that come within the spirit of the inventions are desired to be protected. It should be understood that while the use of words such as preferable, preferably, preferred or more preferred utilized in the description above indicate that the feature so described may be more desirable, it nonetheless may not be necessary and embodiments lacking the same may be contemplated as within the scope of the invention, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

What is claimed is:

1. A method of installing an exit device to a door, the method comprising:

mounting a latch control assembly, a remote latch mechanism including a link member, and a transmission assembly including a transmission to the door;

operably coupling the transmission with the link member such that the transmission is operable to actuate the remote latch mechanism; and engaging the latch control assembly with the transmission assembly using a lift finger and a biasing member, wherein the engaging comprises:

movably mounting the lift finger to a movable component of the latch control assembly;

maintaining the transmission in a transmission predetermined state in which the transmission is in a transmission predetermined position;

maintaining the latch control assembly in a latch control assembly predetermined state corresponding to the transmission predetermined state; and while the transmission is in the transmission predetermined state and while the latch control assembly is in the latch control assembly predetermined state:

engaging the biasing member with the lift finger and urging the lift finger into engagement with the transmission; and while the lift finger is in engagement with the transmission, securing the lift finger to the movable component.

2. The method of claim 1, further comprising attaching a fixture to the transmission assembly such that the fixture retains the transmission in the transmission predetermined position.

3. The method of claim 2, wherein mounting the transmission assembly to the door comprises positioning the transmission assembly within a center cavity of the door such that a lug of the transmission is accessible via the center cavity, and wherein attaching the fixture to the transmission assembly comprises inserting at least a portion of the fixture into the center cavity.

4. The method of claim 1, wherein the latch control assembly predetermined state comprises an actuated state.

5. The method of claim 4, further comprising:

actuating a drive assembly, thereby placing the latch control assembly in the actuated state; and actuating a dogging mechanism such that the dogging mechanism retains the latch control assembly in the actuated state.

6. The method of claim 4, further comprising mounting a pushbar assembly to the door;

wherein the pushbar assembly includes a drive assembly; and wherein the latch control assembly is operably coupled with the drive assembly such that the drive assembly is operable to actuate the latch control assembly.

7. The method of claim 4, wherein the transmission retains the remote latch mechanism in a remote latch mechanism actuated state.

8. The method of claim 7, further comprising attaching a fixture to the transmission assembly such that the fixture engages the transmission, thereby retaining the transmission in the transmission predetermined position.

9. The method of claim 1, wherein the transmission comprises a first transmission, and wherein the transmission assembly further comprises a second transmission.

10. The method of claim 9, further comprising attaching a fixture to the transmission assembly such that the fixture retains the first transmission in a first transmission predetermined position and retains the second transmission in a second transmission predetermined position.

11. The method of claim 10, wherein the first transmission comprises a first lug, wherein the second transmission comprises a second lug, and wherein attaching the fixture to the transmission assembly comprises engaging the fixture with the first lug and with the second lug.

12. The method of claim 1, wherein operably coupling the transmission with the link member comprises attaching a first end of a cable to the link member, and wherein an opposite second end of the cable is coupled to the transmission.

13. The method of claim 12, wherein the transmission comprises a spool, wherein the second end of the cable is coupled to the spool, and wherein the method further comprises rotating the spool to remove slack from the cable.

14. The method of claim 13, wherein rotating the spool to remove slack from the cable is performed prior to engaging the latch control assembly with the transmission assembly.

15. The method of claim 1, wherein the biasing member comprises a coil spring.

16. An exit device, comprising:

a latch control assembly;

a remote latch mechanism including a link member operable to actuate the remote latch mechanism;

a transmission coupled with the link member such that the transmission is operable to actuate the remote latch mechanism;

a self-adjusting coupling assembly operably connecting the transmission with the latch control assembly, the self-adjusting coupling assembly comprising a lift finger movably mounted to a movable component of the latch control assembly, and a biasing member urging the lift finger into contact with the transmission, wherein the lift finger is operable to move against a force of the biasing member out of contact with the transmission, and the biasing member is configured to return the lift finger into contact with the transmission; and a fastener operable to secure the lift finger to the movable component.

17. The exit device of claim 16, further comprising a fixture engaged between the transmission and a housing, the fixture selectively retaining the transmission in a predetermined position.

18. The exit device of claim 16, wherein the biasing member comprises a coil spring.

19. The exit device of claim 16, further comprising a pushbar assembly including a drive assembly; and wherein the latch control assembly is operably coupled with the drive assembly such that the drive assembly is operable to actuate the latch control assembly.

20. An exit device, comprising:

a latch control assembly;

a first remote latch mechanism including a first link member operable to actuate the first remote latch mechanism;

a transmission assembly including a housing and a first transmission movably mounted to the housing and operably coupled with the first link member such that the first transmission is operable to actuate the first remote latch mechanism;

a first lift finger movably mounted to a first movable component of the latch control assembly, and a first biasing member urging the first lift finger into contact with the first transmission, wherein the first lift finger is operable to move against a force of the first biasing member out of contact with the first transmission, and the first biasing member is configured to return the first lift finger into contact with the first transmission;

a first fastener operable to secure the first lift finger to the first movable component;

a second remote latch mechanism and a second fastener;

wherein the second remote latch mechanism includes a second link member operable to actuate the second remote latch mechanism;

wherein the transmission assembly further comprises a second transmission movably mounted to the housing, wherein the second transmission is operably coupled with the second link member such that the second transmission is operable to actuate the second remote latch mechanism; and a second lift finger movably mounted to a second movable component of the latch control assembly, and a second biasing member urging the second lift finger into contact with the second transmission; and wherein the second fastener is operable to secure the second lift finger to the second movable component.

21. The exit device of claim 20, further comprising a fixture selectively retaining the first transmission and the second transmission in predetermined positions relative to the housing.

22. The exit device of claim 20, further comprising a pushbar assembly including a drive assembly; and wherein the latch control assembly is operably coupled with the drive assembly such that the drive assembly is operable to actuate the latch control assembly.

23. A method of installing an exit device comprising a latch control assembly, a remote latch mechanism including a link member operable to actuate the remote latch mechanism, a transmission coupled with the link member such that the transmission is operable to actuate the remote latch mechanism, a self-adjusting coupling assembly operably connecting the transmission with the latch control assembly and including a lift finger movably mounted to a movable component of the latch control assembly, a biasing member urging the lift finger into contact with the transmission, and a fastener operable to secure the lift finger to the movable component, the method comprising:

maintaining the transmission in a transmission predetermined state in which the transmission is in a transmission predetermined position;

maintaining the latch control assembly in a latch control assembly predetermined state corresponding to the transmission predetermined state; and while the transmission is in the transmission predetermined state and while the latch control assembly is in the latch control assembly predetermined state:

urging, by the biasing member, the lift finger into contact with the transmission; and while the lift finger is in contact with the transmission, securing the lift finger to the movable component.

24. The method of claim 23, wherein maintaining the transmission in the transmission predetermined state comprises attaching a fixture to the transmission such that the fixture retains the transmission in the transmission predetermined position.

25. The method of claim 24, wherein the transmission predetermined position is a position in which the transmission retains the latch mechanism in a latch mechanism actuated state; and wherein the latch control assembly predetermined state is a latch control assembly actuated state.

26. The method of claim 23, further comprising:

moving the lift finger against a force of the biasing member out of contact with the transmission; and returning, with the biasing member, the lift finger into contact with the transmission.

* * * * *